US012797846B2

(12) United States Patent
Gomes et al.

(10) Patent No.: US 12,797,846 B2
(45) Date of Patent: Nov. 17, 2026

(54) MODULAR MICROFLUIDICS PLATFORM

(71) Applicant: Parallel Fluidics, Inc., Boston, MA (US)

(72) Inventors: Joshua Gomes, Boston, MA (US); Andrew Harris, Boston, MA (US)

(73) Assignee: Parallel Fluidics Inc., Boston, MA (US)

( * ) Notice: Subject to any disclaimer, the term of this patent is extended or adjusted under 35 U.S.C. 154(b) by 547 days.

(21) Appl. No.: 18/211,050

(22) Filed: Jun. 16, 2023

(65) Prior Publication Data

US 2023/0330660 A1 Oct. 19, 2023

Related U.S. Application Data

(63) Continuation of application No. PCT/US2021/064542, filed on Dec. 21, 2021.

(Continued)

(51) Int. Cl.

*B01L 3/00* (2006.01)
*B01D 11/02* (2006.01)
*B01D 15/08* (2006.01)
*B01F 33/302* (2022.01)
*B01F 33/3033* (2022.01)
*B01J 8/00* (2006.01)

(Continued)

(52) U.S. Cl.

CPC ... *B01L 3/502707* (2013.01); *B01L 3/502738* (2013.01); *B01D 11/0265* (2013.01); *B01L 2300/12* (2013.01); *E04B 2001/849* (2013.01); *E04F 13/0894* (2013.01)

(58) Field of Classification Search

CPC ......... B01L 3/502707; B01L 3/502738; B01L 2300/12; B01L 2200/027; B01L 2300/0816; B01L 2300/0883; B01L 2300/0887; B01L 3/502715; B01D 11/0265; E04B 2001/849; E04F 13/0894

See application file for complete search history.

(56) References Cited

U.S. PATENT DOCUMENTS 7,004,198 B1 2/2006 Okandan et al.
7,569,127 B1 8/2009 Cho (Continued)

FOREIGN PATENT DOCUMENTS

CN 110639627 A 1/2020
EP 2719460 A1 4/2014

OTHER PUBLICATIONS

Supplementary European Search Report for EP Application No. 21912020.1 dated Oct. 28, 2024.

(Continued)

*Primary Examiner* — Oyeleye Alexander Alabi

(74) *Attorney, Agent, or Firm* — Erik A. Huestis; Joshua S. Matloff; Foley Hoag LLP

(57) ABSTRACT

Modular microfluidic platforms are provided. A microfluidic device comprises a solid substrate having a first side and a second side. The solid substrate has at least one via extending through the solid substrate from the first side to the second side. The first side has at least one channel formed therein, the at least one channel in fluid communication with the at least one via. The second side has a continuous groove therein, the continuous groove circumscribing the at least one via and not being in fluid communication with the at least one via.

18 Claims, 18 Drawing Sheets

Related U.S. Application Data

(60) Provisional application No. 63/130,178, filed on Dec. 23, 2020.

(51) Int. Cl.

| | |
|---|---|
| ***B01J 8/02*** | (2006.01) |
| ***B01J 20/285*** | (2006.01) |
| ***B01J 20/287*** | (2006.01) |
| ***B01J 20/32*** | (2006.01) |
| ***B01L 7/00*** | (2006.01) |
| ***B01L 9/00*** | (2006.01) |
| ***B65G 47/80*** | (2006.01) |
| ***B82Y 20/00*** | (2011.01) |
| ***B82Y 30/00*** | (2011.01) |
| ***B82Y 40/00*** | (2011.01) |
| ***C02F 1/469*** | (2023.01) |
| ***C08L 5/08*** | (2006.01) |
| ***C12M 1/34*** | (2006.01) |
| ***C12M 3/06*** | (2006.01) |
| ***C12N 1/14*** | (2026.01) |
| ***C12N 1/20*** | (2026.01) |
| ***C12Q 1/02*** | (2006.01) |
| ***C12Q 1/6806*** | (2018.01) |
| ***C12Q 1/6844*** | (2018.01) |
| ***C12Q 1/6848*** | (2018.01) |
| ***C12Q 1/6851*** | (2018.01) |
| ***C12Q 1/686*** | (2018.01) |
| ***E04B 1/84*** | (2006.01) |
| ***E04F 13/08*** | (2006.01) |
| ***G01K 1/14*** | (2021.01) |
| ***G01N 1/44*** | (2006.01) |
| ***G01N 15/10*** | (2024.01) |
| ***G01N 15/14*** | (2024.01) |
| ***G01N 15/1433*** | (2024.01) |
| ***G01N 21/01*** | (2006.01) |
| ***G01N 21/03*** | (2006.01) |
| ***G01N 21/05*** | (2006.01) |
| ***G01N 21/29*** | (2006.01) |
| ***G01N 21/33*** | (2006.01) |
| ***G01N 21/35*** | (2014.01) |
| ***G01N 21/65*** | (2006.01) |
| ***G01N 21/75*** | (2006.01) |
| ***G01N 21/77*** | (2006.01) |
| ***G01N 27/07*** | (2006.01) |
| ***G01N 27/28*** | (2006.01) |
| ***G01N 27/416*** | (2006.01) |
| ***G01N 30/02*** | (2006.01) |
| ***G01N 30/60*** | (2006.01) |
| ***G01N 30/72*** | (2006.01) |
| ***G01N 31/10*** | (2006.01) |
| ***G01N 31/12*** | (2006.01) |
| ***G01N 33/543*** | (2006.01) |
| ***G01N 33/557*** | (2006.01) |
| ***G01N 33/564*** | (2006.01) |
| ***G01N 33/574*** | (2006.01) |
| ***G01N 33/575*** | (2026.01) |
| ***G01N 33/57515*** | (2026.01) |
| ***G01N 33/58*** | (2006.01) |
| ***G01N 33/68*** | (2006.01) |
| ***G01N 33/72*** | (2006.01) |
| ***G01N 35/00*** | (2006.01) |
| ***H05B 45/10*** | (2020.01) |

(56) References Cited

U.S. PATENT DOCUMENTS

| | | | |
|---|---|---|---|
| 2005/0151371 A1 | 7/2005 | Simmons et al. | |
| 2009/0152326 A1* | 6/2009 | Shin | B81C 3/001 228/110.1 |
| 2011/0018259 A1 | 1/2011 | Arnold et al. | |
| 2014/0102546 A1* | 4/2014 | Pingert | B01L 3/502707 137/15.01 |
| 2016/0074864 A1 | 3/2016 | Tsao et al. | |
| 2016/0339431 A1 | 11/2016 | Shmilovich et al. | |
| 2018/0016537 A1 | 1/2018 | Levner et al. | |
| 2018/0017586 A1* | 1/2018 | Levner | G01N 33/80 |
| 2019/0169557 A1 | 6/2019 | Levner et al. | |
| 2019/0299210 A1* | 10/2019 | Lemoine | F04B 19/006 |
| 2020/0306755 A1 | 10/2020 | Chang et al. | |

OTHER PUBLICATIONS

International Search Report and Written Opinion for International Application No. PCT/US2021/064542 dated Mar. 17, 2022.

* cited by examiner

MODULAR MICROFLUIDICS PLATFORM

CROSS-REFERENCE TO RELATED APPLICATIONS

This application is a continuation of International Application No. PCT/US2021/064542, filed Dec. 21, 2021, which claims the benefit of U.S. Provisional Application No. 63/130,178, filed Dec. 23, 2020, each of which is hereby incorporated by reference in its entirety.

BACKGROUND

Embodiments of the present disclosure relate to microfluidic chips and components, and more specifically, to modular microfluidic platforms.

BRIEF SUMMARY

According to embodiments of the present disclosure, microfluidics devices are provided. A microfluidic device comprises a solid substrate having a first side and a second side. The solid substrate has at least one via extending through the solid substrate from the first side to the second side. The first side has at least one channel formed therein, the at least one channel in fluid communication with the at least one via. The second side has a continuous groove therein, the continuous groove circumscribing the at least one via and not being in fluid communication with the at least one via.

In various embodiments, a cap is disposed on the first side of the solid substrate, covering the at least one channel.

In various embodiments, the continuous groove is circular. In various embodiments, the continuous groove is polygonal.

In various embodiments, a module is disposed on the second side, the module having a continuous tongue extending into the continuous groove, the continuous tongue affixed within the continuous groove by an ultrasonic weld circumscribing the at least one via.

In various embodiments, the module comprises a module via in fluid communication with at least one of the at least one via.

In various embodiments, a rotational positioning groove is in the second side, the rotational positioning groove partially circumscribing the at least one via, the module having a rotational positioning tongue extending into the rotational positioning groove. In various embodiments, the rotational positioning groove abuts the continuous groove. In various embodiments, the rotational positioning tongue is affixed within the rotational positioning groove by an ultrasonic weld.

In various embodiments, the module comprises a reservoir in fluid communication with the module via. In various embodiments, the module comprises a valve in fluid communication with the module via. In various embodiments, the module comprises a luer lock in fluid communication with the module via. In various embodiments, the module comprises a sample chamber in fluid communication with the module via. In various embodiments, the module comprises a pump in fluid communication with the module via. In various embodiments, the module comprises a sensor in fluid communication with the module via. In various embodiments, the module comprises a bubble trap in fluid communication with the module via. In various embodiments, the module comprises a gasket interface in fluid communication with the module via. In various embodiments, the module comprises a threaded connector.

In various embodiments, the module comprises at least one electrode configured to apply an electromagnetic field to the at least one via. In various embodiments, the module comprises a heater configured to apply heat to the at least one via. In various embodiments, the module comprises a light configured to illuminate the at least one via.

In various embodiments, the solid substrate comprises a thermoplastic.

According to embodiments of the present disclosure, microfluidics devices are provided. A microfluidic device comprises a solid substrate having a first side and a second side. The solid substrate has at least one via extending through the solid substrate from the first side to the second side. The first side has at least one channel formed therein, the at least one channel in fluid communication with the at least one via. The second side has a continuous tongue extending therefrom, the continuous tongue circumscribing the at least one via.

In various embodiments, a module is disposed on the second side, the module having a continuous groove therein, the continuous tongue extending into the continuous groove, the continuous tongue affixed within the continuous groove by an ultrasonic weld circumscribing the at least one via.

According to embodiments of the present disclosure, methods of constructing a modular microfluidic device are provided. A module is positioned on a solid substrate. The solid substrate has a first side and a second side. The solid substrate has at least one via extending through the solid substrate from the first side to the second side. The first side has at least one channel formed therein, the at least one channel in fluid communication with the at least one via. The second side has a continuous groove therein, the continuous groove circumscribing the at least one via and not being in fluid communication with the at least one via. The module has a continuous tongue. The continuous tongue has a continuous boss thereon. Positioning comprises placing the continuous tongue into the continuous groove. Ultrasound is applied to the module, thereby causing the boss to melt, creating an ultrasonic weld within the continuous groove and circumscribing the at least one via.

In various embodiments, applying ultrasounds comprises contacting the module with an ultrasonic horn.

According to embodiments of the present disclosure, methods of constructing a modular microfluidic device are provided. A module is positioned on a solid substrate. The solid substrate has a first side and a second side. The solid substrate has at least one via extending through the solid substrate from the first side to the second side. The first side has at least one channel formed therein, the at least one channel in fluid communication with the at least one via. The second side has a continuous tongue thereon, the continuous tongue circumscribing the at least one via. The module has a continuous groove. The continuous tongue has a continuous boss thereon. Positioning comprises placing the continuous tongue into the continuous groove. Ultrasound is applied to the solid substrate, thereby causing the boss to melt, creating an ultrasonic weld within the continuous groove and circumscribing the at least one via.

DETAILED DESCRIPTION

Figure 1:
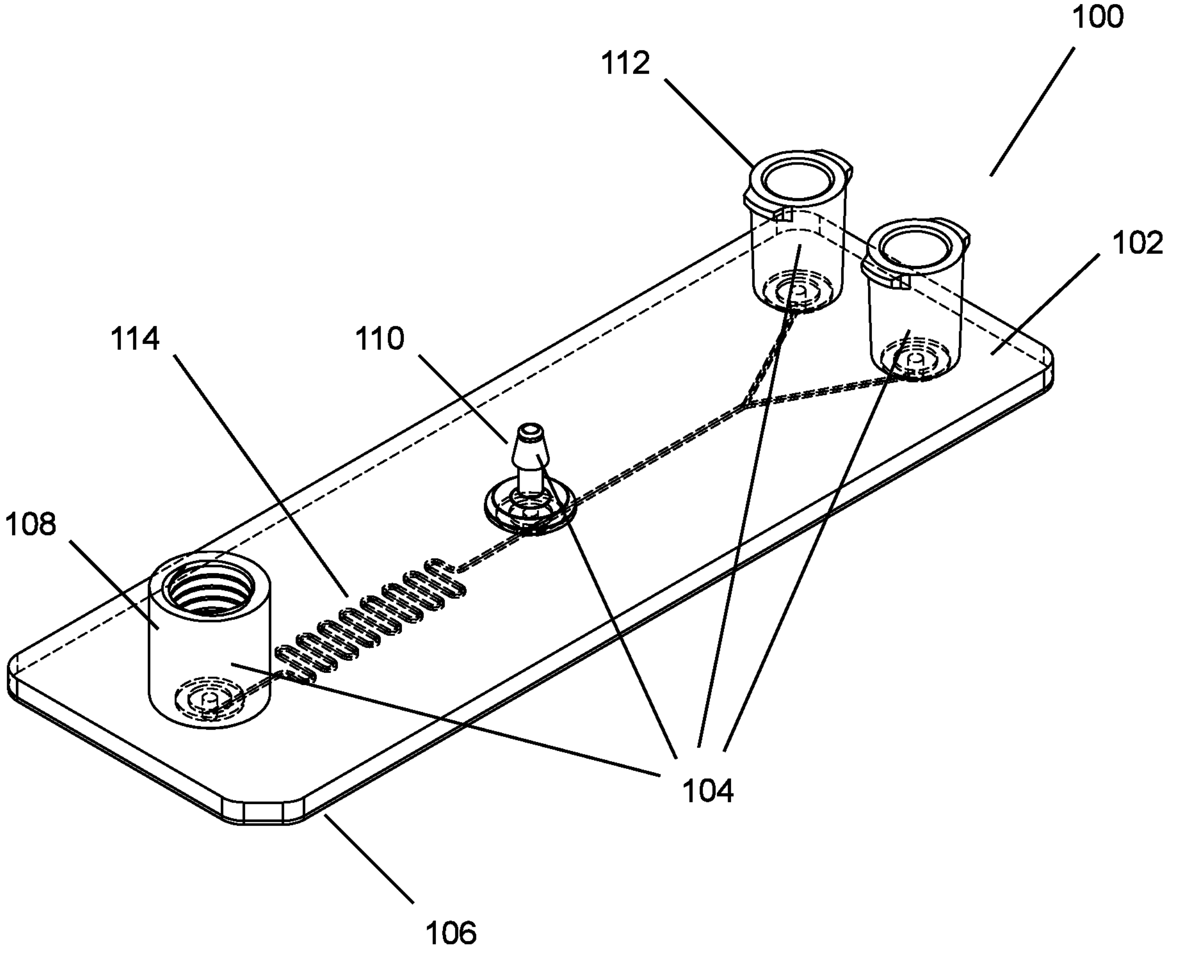
FIG. 1 is a perspective view of a microfluidic device according to embodiments of the present disclosure.

Researchers in the life sciences industry consistently seek to manipulate fluids, cells, and molecules on ever decreasing scales to improve the precision of their experiments. This need has led to the creation of the field of Microfluidics, the study and engineering of fluid flow through channels that are geometrically constrained to features smaller than 1 millimeter in at least one dimension when viewed in cross section.

The laminar flow found at these scales gives scientists greater control of their experiments and is more representative of naturally occurring fluidic systems within organisms. Environments that previously could only be found in-vivo can now be recreated in-vitro, reducing the cost and risk associated with drug development. Additionally, microfluidic techniques can be used to combine many different laboratory processes into a single, easy-to-use, disposable device. The automation and price points afforded by microfluidic devices have transformed the diagnostic industry by allowing for near instantaneous test results directly at the point-of-care. Still, other fields like genetic sequencing, proteomics, and microbiology have all been improved through the use of microfluidic techniques.

A major factor in the success of microfluidic devices is that they can be manufactured cheaply at high volumes. Integrated designs that include not only the important microfeatures critical to flow experiments, but also reservoirs for samples, connectors, sensors, and interfaces to external instruments can be produced for a few dollars each when manufactured in thermoplastic materials at quantities in the tens of thousands, typically by injection molding. However, injection molding tooling for complex designs can cost $100,000 or more and can take months to build. Despite the improvement of flow simulation techniques in recent years, microfluidic device design is still an iterative process that might take many design cycles of physical prototypes to achieve a functional product. The time and cost associated with injection molding integrated designs force microfluidic developers to explore alternative manufacturing techniques to manufacture prototype parts quickly.

Several techniques may be used to build prototypes. One example is to cast PDMS (polydimethylsiloxane), a soft silicone rubber, onto a mold created by photolithography. A main drawback of this technique is that PDMS is not representative of the thermoplastics that most developers seek to use for a commercial product. PDMS absorbs gases and small molecules, creating unwanted variation in experiments, and its soft nature makes it less robust and more challenging to incorporate into automated instruments than hard thermoplastics. Thus, a design that works perfectly well in PDMS likely will fail if produced in thermoplastics. The discrepancy makes PDMS a poor choice for prototyping devices that will eventually become commercial products. Additionally, it is relatively simple to form the microfeatures within a PDMS prototype. However, the process is not readily compatible with forming the connectors, reservoirs, or instrument interfacing components that are often required. Thus, PDMS prototypes often need to be bonded or attached to other devices to function within a larger microfluidic system.

3D printing is an interesting prototyping technique because entirely new designs can be created in a matter of hours. The speed of the process is extremely valuable, allowing developers to iterate through different designs quickly. However, 3D printed prototypes also have severe material and process limitations. Many microfluidics applications require a clean, smooth, and inert surface within the device's microfeatures to effectively conduct their experiments. 3D printing via fused deposition modeling creates prototypes by extruding a small bead of thermoplastic to build a device layer by layer. The layered extrusion approach yields parts that are not water resistant, have an inherently ridged surface with very poor optical properties. Additionally, FDM printers typically do not have the resolution required to create 3D microfeatures accurately. These properties make FDM printing a poor candidate for microfluidics.

3D printing via stereolithography uses an approach where a laser cures a photosensitive resin to grow the parts layer by layer. This technique offers a better surface finish than FDM, but the material limitations are significant. Optically cured materials are less inert than thermoplastics and are often compromised by solvents that are used in many microfluidic tasks. Additionally, any resin that is not fully polymerized during the curing process can contaminate experimental results. The ability to visualize processes occurring in microfeatures is also critical to many microfluidic experiments. Most photosensitive materials are opaque, rendering them useless for imaging applications, and the few available clear resins have optical properties that are subpar for microfluidic analysis. Another major drawback in any 3D printing technology is that it is difficult to accurately print enclosed channels with overhanging geometry. Many 3D printing systems are incapable of printing this type of feature without physical support structures, which are impossible to remove when inside microchannels. Despite the speed advantage, 3D printing is thus not suitable for microfluidic prototyping.

Another alternative is producing microfluidic prototypes via micromachining. A computer controlled milling machine or laser is used to subtractively produce a microfluidic device from a block or sheet of thermoplastic materials. A main advantage of this process is that the materials suitable for eventual high volume manufacturing can be used effectively. This allows the prototypes to be produced with the same material properties as the end product, a desirable result. Another advantage of this technique is that the prototype device can include the necessary external features like connectors, reservoirs, or machine interfaces to match the desired commercial end product. However, most existing machine shops are not equipped to produce the extremely small geometry required by microfluidic applications. In the case of milling, producing a 100 micron channel would require an end mill smaller than 100 microns in diameter. The small cutting tools require unique machinery and skill sets that are outside the capability of most quick turnaround machine shops. A complicated integrated design may also take multiple hours of machine time to produce via micromachining. This limits the speed with which prototypes can be produced and raises the cost of each prototype. Since most microfluidic prototypes must be disposed of after a single use, the cost and lead time associated with this method make it unsustainable. Part to part variation is also a key consideration that must be considered since the prototypes are each made sequentially.

An integrated device design often requires macro-scale features in addition to the microchannels within the microfluidic device. The large features may be necessary to accomplish tasks such as sample media storage, connection to an external pump, or integration with sensing equipment. Even if one of the above strategies is useful for producing microfeatures, it often is unable to create the additional macro features that an integrated device may require. Microfluidic technology developers may be forced to overcome this shortcoming by attaching external components after device manufacture using glue, adhesive tapes, or other techniques. Any time a new component must be bonded to a microfluidic device, there is always a risk of channel occlusion, misalignment, or contamination due to the bonding materials.

An alternative to producing integrated prototypes is to create separate, simpler devices and then connect them with tubing to create a mock integrated device. The advantage of this strategy is that the individual subsystems are often easier to prototype than a truly integrated design. However, the tubing connections between devices create additional wasted liquid volume, otherwise known as dead volume, between the subsystems and require tubing connections that are prone to failure and leaks. The inherent differences between subsystems connected via tubing and an integrated design can lead to a variety of unknowns when inevitably attempting to transition to a truly integrated design compatible with high volume manufacturing.

Sometimes, the dead volume introduced by the tubing technique is unacceptable in a microfluidic design, forcing developers to prototype individual subsystems, test them separately, and then risk producing an integrated device in high volume by injection molding without ever testing a functional integrated prototype. The assumptions necessary with this approach often result in devices that do not function properly and can lengthen project timelines when revisions inevitably need to be made, further complicating the microfluidic development process.

In addition to the fabrication problems, the typical quoting process required by prototype vendors also increases the cost and time to create microfluidic prototypes. A standard workflow for a microfluidic engineer is to design their parts, create a three dimensional computer-aided-design model (3D CAD model) or drawing, and then send the model to a vendor for a quote. The quoting process may take many back and forth conversations before a design that fits the vendor's process can be finalized, and a quote is received. This valuable lost time further impedes the iteration of the microfluidic development process and increases product cost.

The present disclosure enabled speed up of the microfluidic design process by quickly quoting and producing integrated microfluidic prototypes that have accurate features, inert materials, good optical properties, and interfacing components in a standardized format. Processes described herein can produce a testable batch of prototypes in a matter of days, allowing microfluidic developers to iterate through the design process quickly. The risk and cost of commercializing a new microfluidic product is decreased because standardized device construction and pre-built components reduce engineering risk and effort for developers.

The present disclosure enables prototypes to be produced as entirely integrated systems, instead of requiring multiple devices that must be connected by tubing, preventing unnecessary dead volume and failures. When the prototype phase is complete, these processes allow developers to quickly and easily transition to high volume processes like injection molding, because the materials, features, and methods are all transferable to high volume techniques. The microfluidic prototyping platform provided herein lowers the cost of microfluidic development and ensure that more technologies successfully get to market.

As set out in further detail below, the present disclosure provides a microfluidic device prototyping platform that addresses the shortcomings of alternative microfluidic prototyping processes.

Referring now to FIG. 1, a perspective view of a microfluidic device 100 according to the prototyping platform provided herein is shown. The microfluidic device contains a solid substrate with microchannels 102, which may be rectangular, circular, or any other shape produced in a thermoplastic material such as polycarbonate, cyclic olefin copolymer, cyclic olefin polymer, polymethylmethacrylate, polystyrene, polyethylene terephthalate, polyethylene terephthalate glycol, high density polyethylene, polypropylene, polyetheretherketone, polyoxymethylene, and others. Components 104 are affixed to the top surface of the solid substrate 102 with microchannels. The components 104 may be the same thermoplastic material as the solid substrate 102, or a different thermoplastic material. Examples of such components may be a threaded component 108, a barb component 110, a tapered component 112, reservoirs, sample chambers, pumps, sensors, bubble traps, gasket interfaces, electrodes, valves, heaters, or any other component that might be useful in a microfluidic device. A cap 106 is bonded to the bottom surface of the solid substrate 102.

Figure 2:
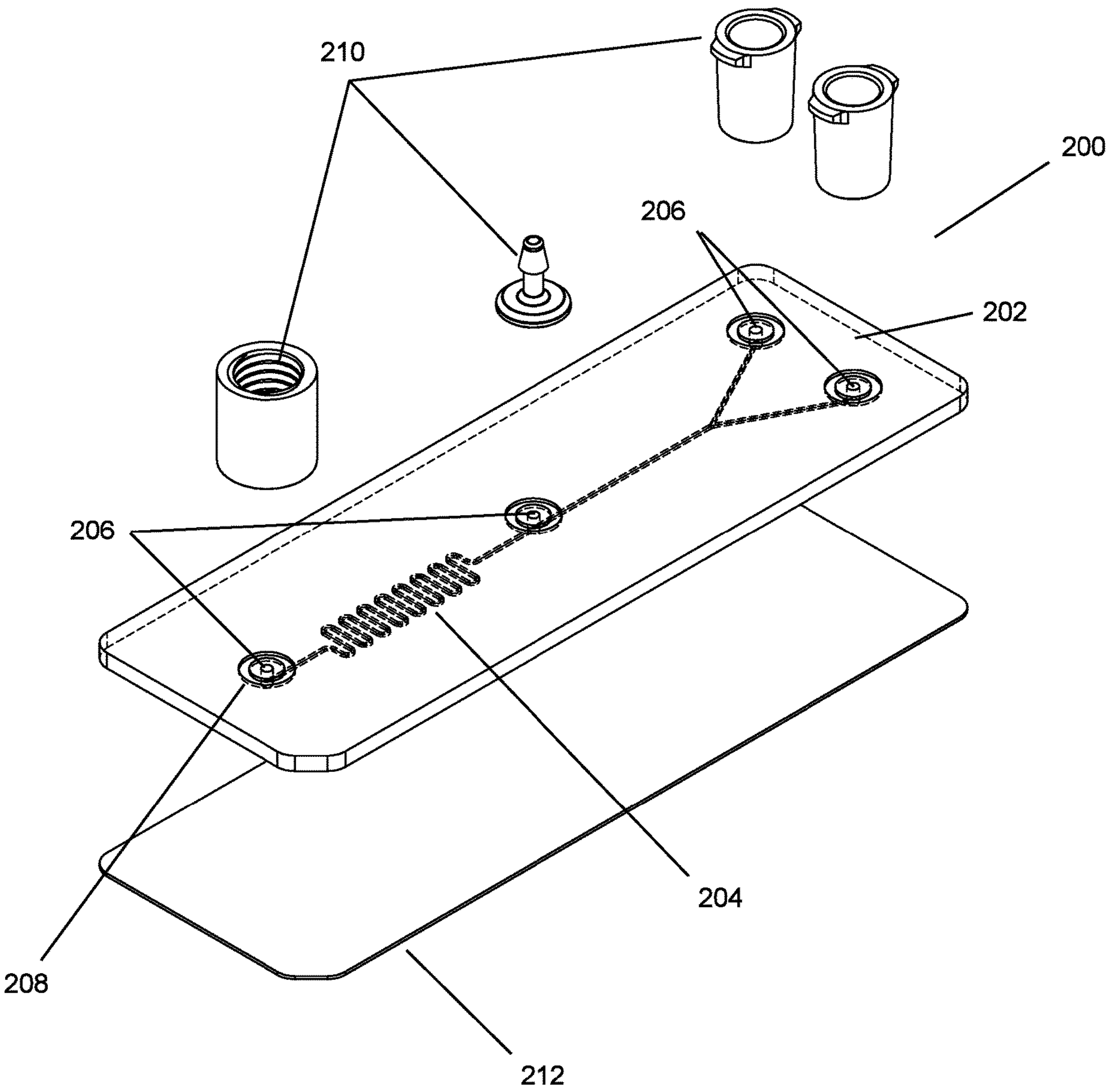
FIG. 2 is an exploded view of a microfluidic device according to embodiments of the present disclosure.

Referring now to FIG. 2, an exploded view of a microfluidic device 200 is shown. The solid substrate 202 contains microfeatures 204 (e.g., microchannels), features smaller than 1 millimeter in at least one dimension when viewed in cross section, formed into its bottom surface. The microfeatures 204 represented are only an example and may be any geometry useful in a microfluidic system as defined by a user of our process. Vias 206 are continuous channels that pass from the top surface of the solid substrate 202 to its bottom surface and may connect to the microfeatures 204 on the bottom surface of the solid substrate 202. Each via 206 is surrounded by a concentric groove 208 recessed into the top surface of the solid substrate with microchannels 202.

Figure 3:
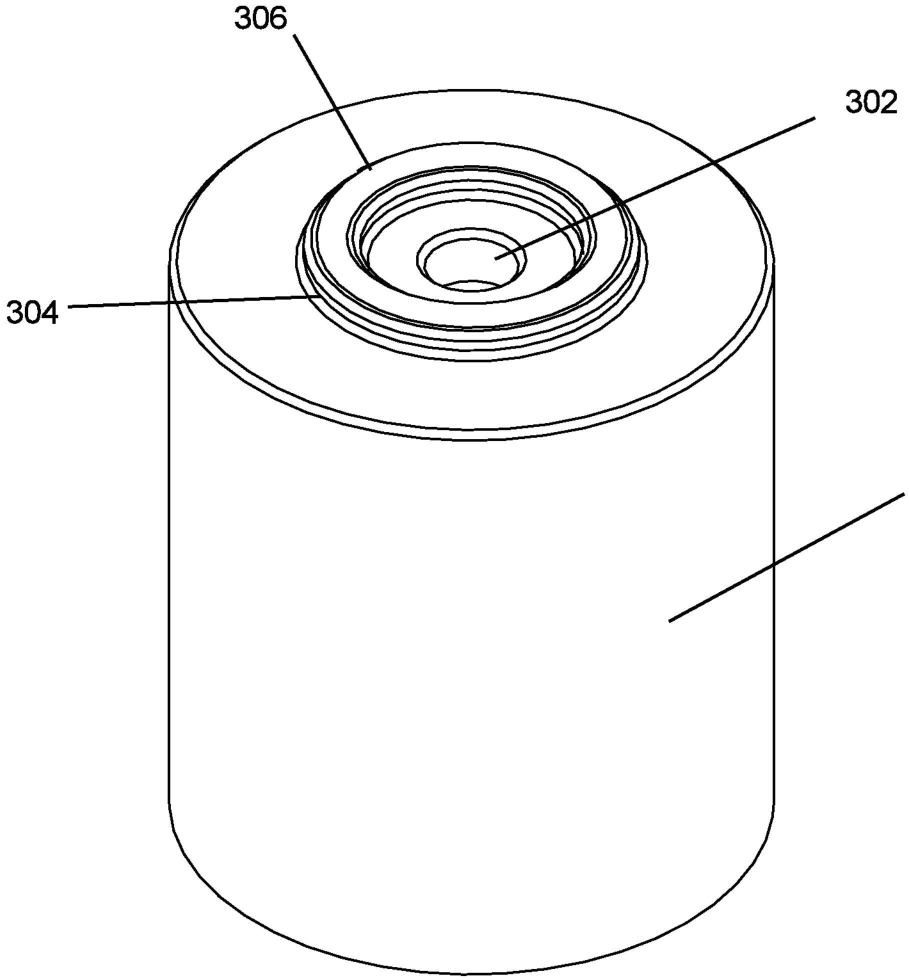
FIG. 3 is a bottom perspective view of a microfluidic component according to embodiments of the present disclosure.

FIG. 3 shows a bottom perspective view of an example of a threaded component 300. The threaded component includes an outlet hole 302 surrounded concentrically by a raised tongue 304. The tongue contains a half-round boss 306 protruding from its surface.

Figure 4:
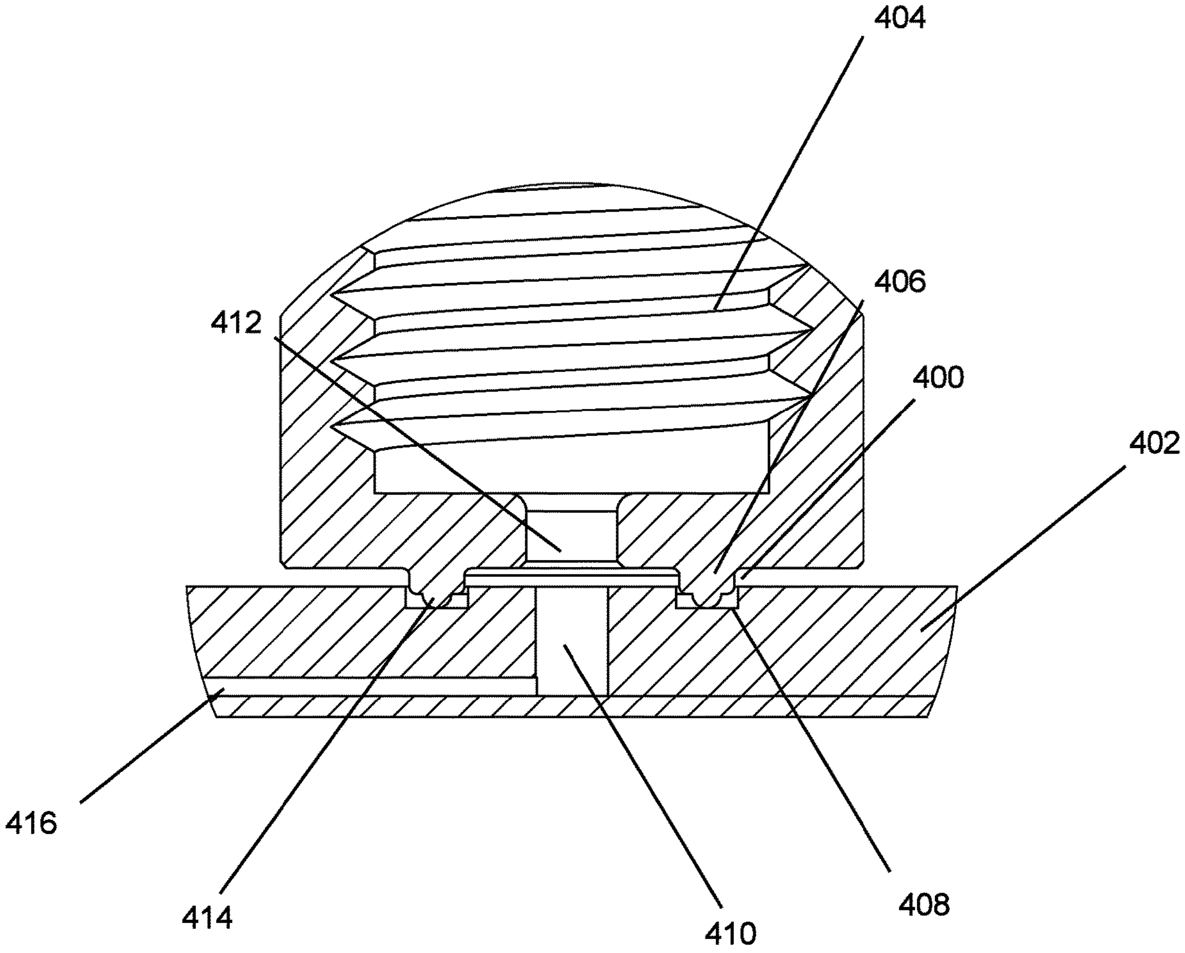
FIG. 4 is a front partial section view of an interface between a solid substrate and a microfluidic component according to embodiments of the present disclosure.

Referring now to FIG. 4, a front partial section view of the interface 400 between a solid substrate 402 and a component such as a threaded fitting 404 or any other component. The tongue 406 of the threaded fitting 404 fits snugly into the groove 408 of the solid substrate 402, causing the via 410 to be well aligned with the outlet hole 412 in the threaded fitting 404, also ensuring there is an open channel between the threaded fitting 404 and the microfeatures 416 in the solid substrate 402. The boss 414 rests on the bottom surface of the groove 408. The dimensions, shape, and surface finish of the tongue 406, boss 414, and groove 406 may be adjusted depending on the application.

Figure 17:
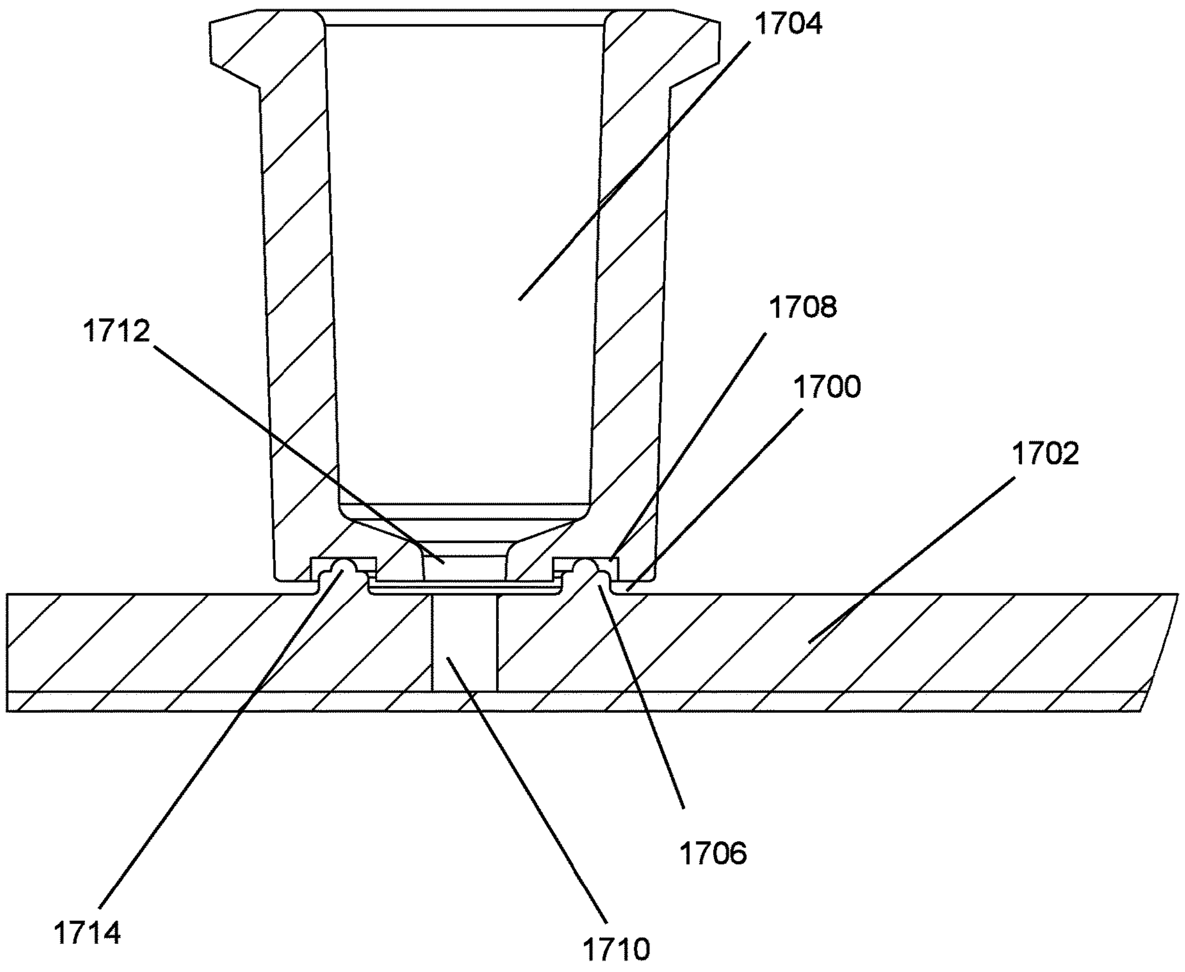
FIG. 17 is a front section view of a reservoir component according to embodiments of the present disclosure.

Referring now to FIG. 17, an exemplary embodiment is shown with an interface 1700 between a solid substrate 1702 and a component 1704. In this embodiment the tongue 1706 resides on the solid substrate 1702, and the groove 1708 resides in the component 1704. The tongue 1706 fits snugly into the groove 1708, causing the via 1710 to be well aligned to the outlet hole 1712 in the component 1704, ensuring there is an open channel between the component 1704 and the via 1710. The top surface of the groove 1708 rests on the boss 1714. The dimensions, shape, and surface finish of the tongue 1706, boss 1714, and groove 1706 may be adjusted depending on the application.

Figure 5:
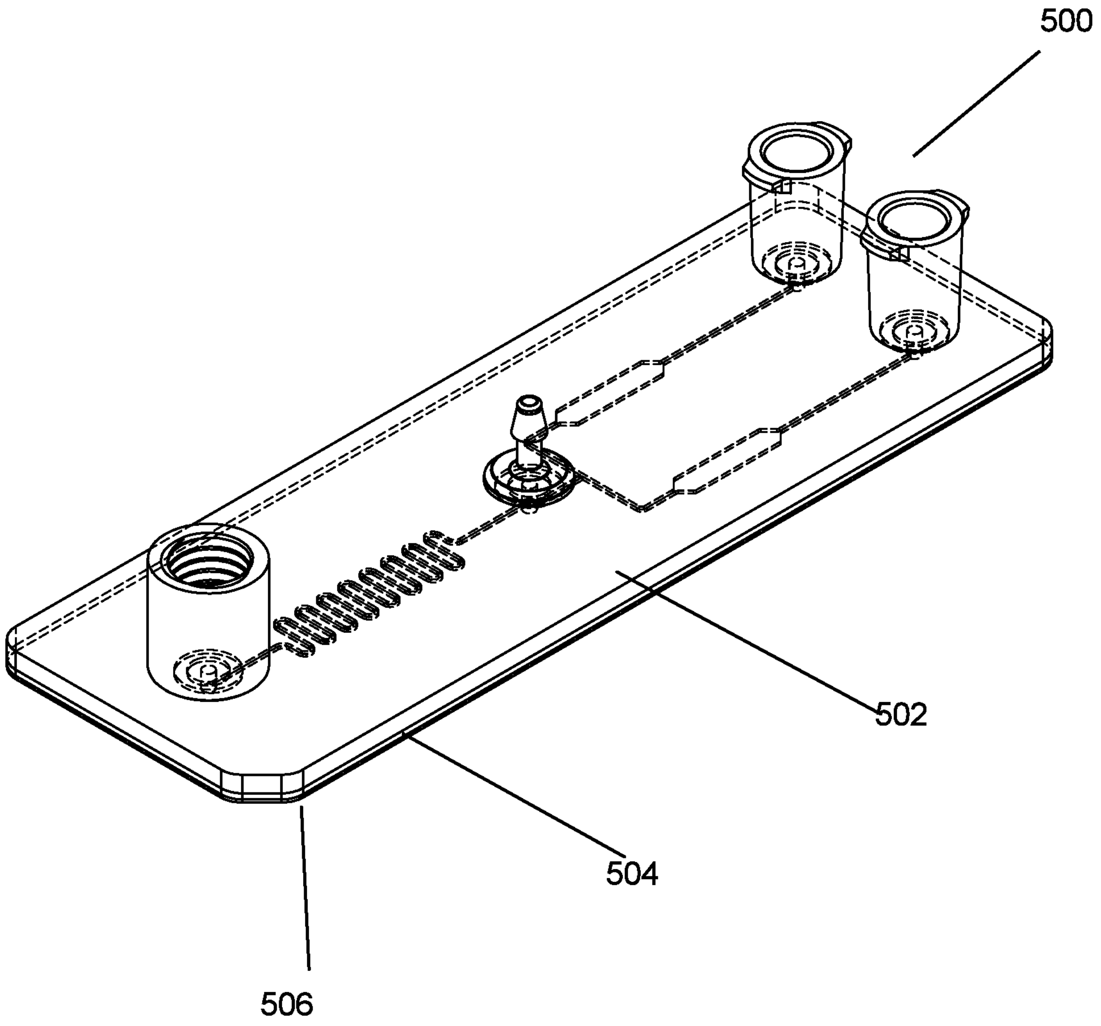
FIG. 5 is a perspective view of a multilayer microfluidic device according to embodiments of the present disclosure.

FIG. 5 shows a front perspective view of a multilayer microfluidic device 500. The bottom surface of the upper solid substrate 502 is bonded to the top surface of the lower solid substrate 504. A cap 506 is bonded to the bottom surface of the lower solid substrate with microchannels.

Figure 6:
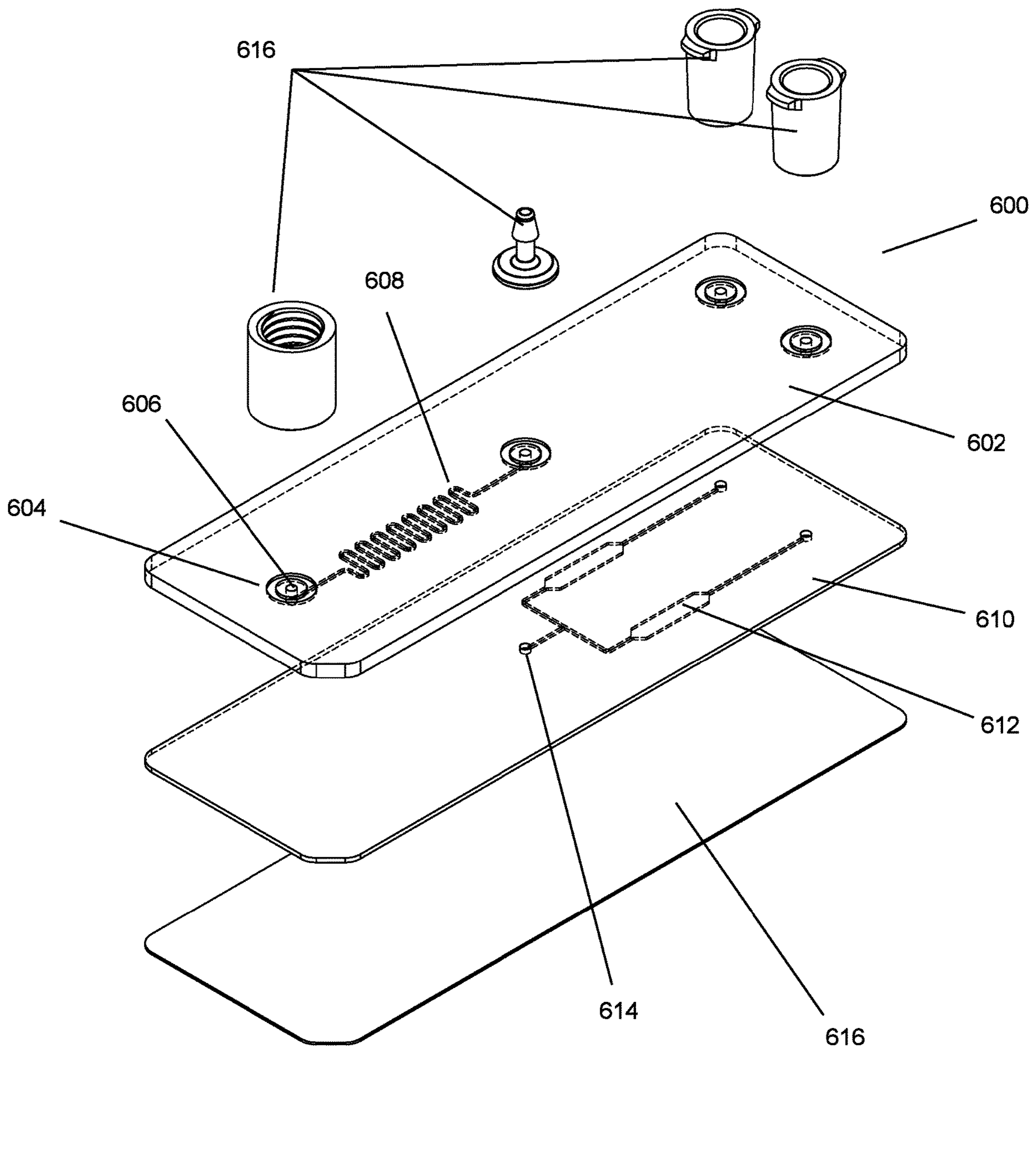
FIG. 6 is an exploded view of a multilayer microfluidic device according to embodiments of the present disclosure.

Referring now to FIG. 6, an exploded view of the multilayer microfluidic device 600 is shown. The upper solid substrate 602 contains interfaces 604, vias 606, and microfeatures 608, similar to those previously described in FIGS. 1-4. The lower solid substrate 610 may be comprised of microfeatures 612 formed into its bottom surface and vias 614 that may connect the lower solid substrate 610 to microfeatures 608 in the upper solid substrate 602 or to vias 606 in the upper solid substrate 602 that connect directly to components 616 located on its top surface.

Figure 7:
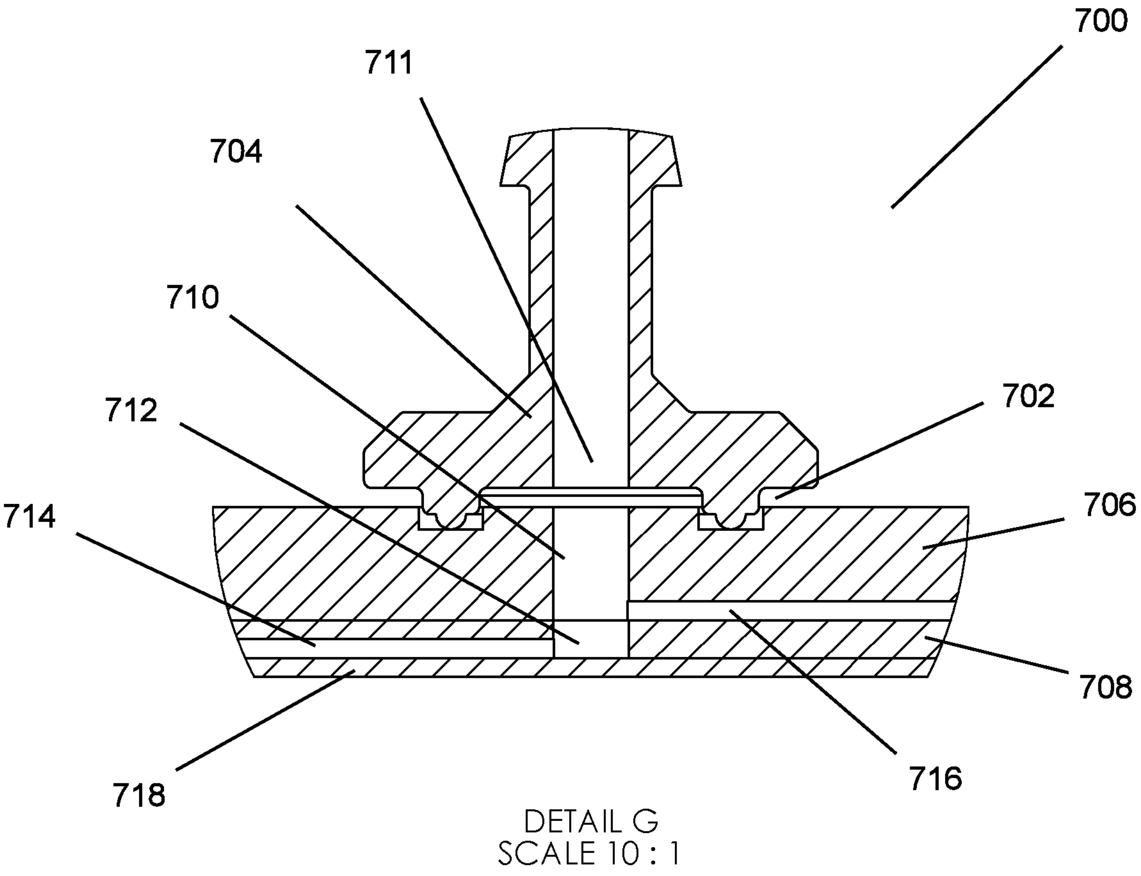
FIG. 7 is a front partial section view of a multilayer microfluidic device according to embodiments of the present disclosure.

FIG. 7 shows a front partial section view of a multilayer microfluidic device 700. The interface 702 between a component 704 and the upper solid substrate 706 is similar to that described in FIG. 4. A lower solid substrate 708 may be bonded to the bottom surface of the upper solid substrate 706. The via 710 in the upper solid substrate 706 is aligned to the via 712 in the lower solid substrate 708. Thus, there is an open connection between the microfeatures 714 in the lower solid substrate 708 and the microfeatures 716 in the upper solid substrate 706. A cap 716 is bonded to the bottom surface of the lower solid substrate 708. The figure represents a microfluidic device 700 with two solid substrates with microchannels. However, a microfluidic device may have more or fewer solid substrates depending on the application. Additionally, some solid substrates may not require custom microfeatures but may be solid, perforated, fibrous, or treated with a surface modification advantageous for the desired end product.

Figure 8:
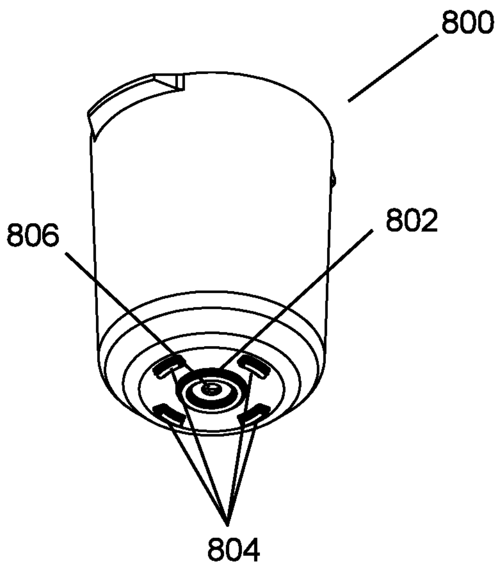
FIG. 8 is a bottom perspective view of a reservoir component according to embodiments of the present disclosure.

A bottom perspective view of a reservoir component is shown in FIG. 8. The interface 802 is similar to the one shown in FIG. 3, but the interface 802 is surrounded by additional reinforcement tabs 804. The reinforcement tabs 804 are spaced further from the output hole 806 than the interface 802. Reinforcement tabs 804 are shown on a reservoir component 800, but may also be applied to any other component. The number, spacing, and dimensions of reinforcement tabs 804 may be varied to better match the component and the application. These tabs provide a rotational positioning guide for components. In particular, where the component may be rotated while maintaining contact along interface 802, this additional tab constrains the rotational positioning of the component. It will be appreciated that a variety of such tab geometries may be used.

Figure 9:
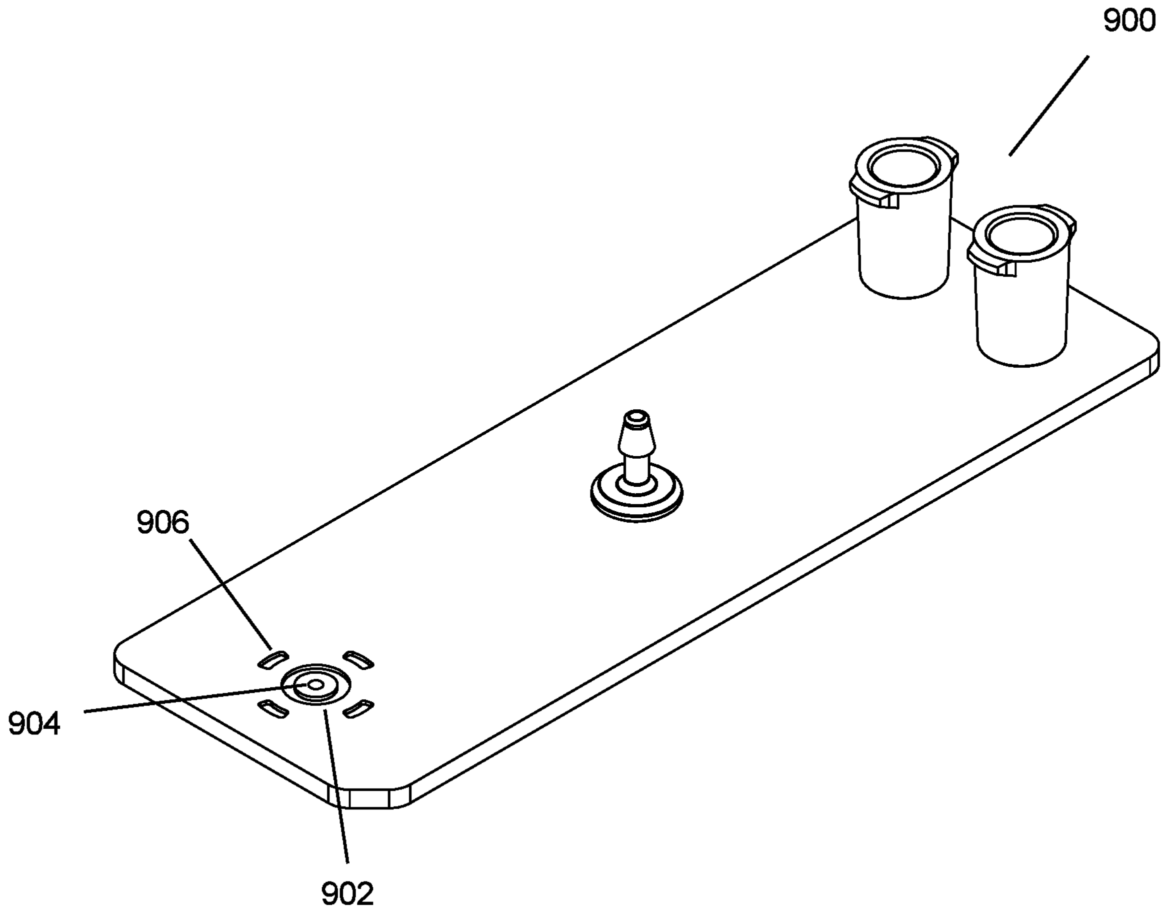
FIG. 9 is a front perspective view of a microfluidic device according to embodiments of the present disclosure.

Referring now to FIG. 9, a front perspective view of a microfluidic device 900 is shown. An interface 902 similar to that shown in FIG. 2 surrounds a via 904. Reinforcement recesses 906 surround the interface 902. The reinforcement recesses 906 are designed to mate with the reinforcement tabs 802 shown in FIG. 8.

Figure 10:
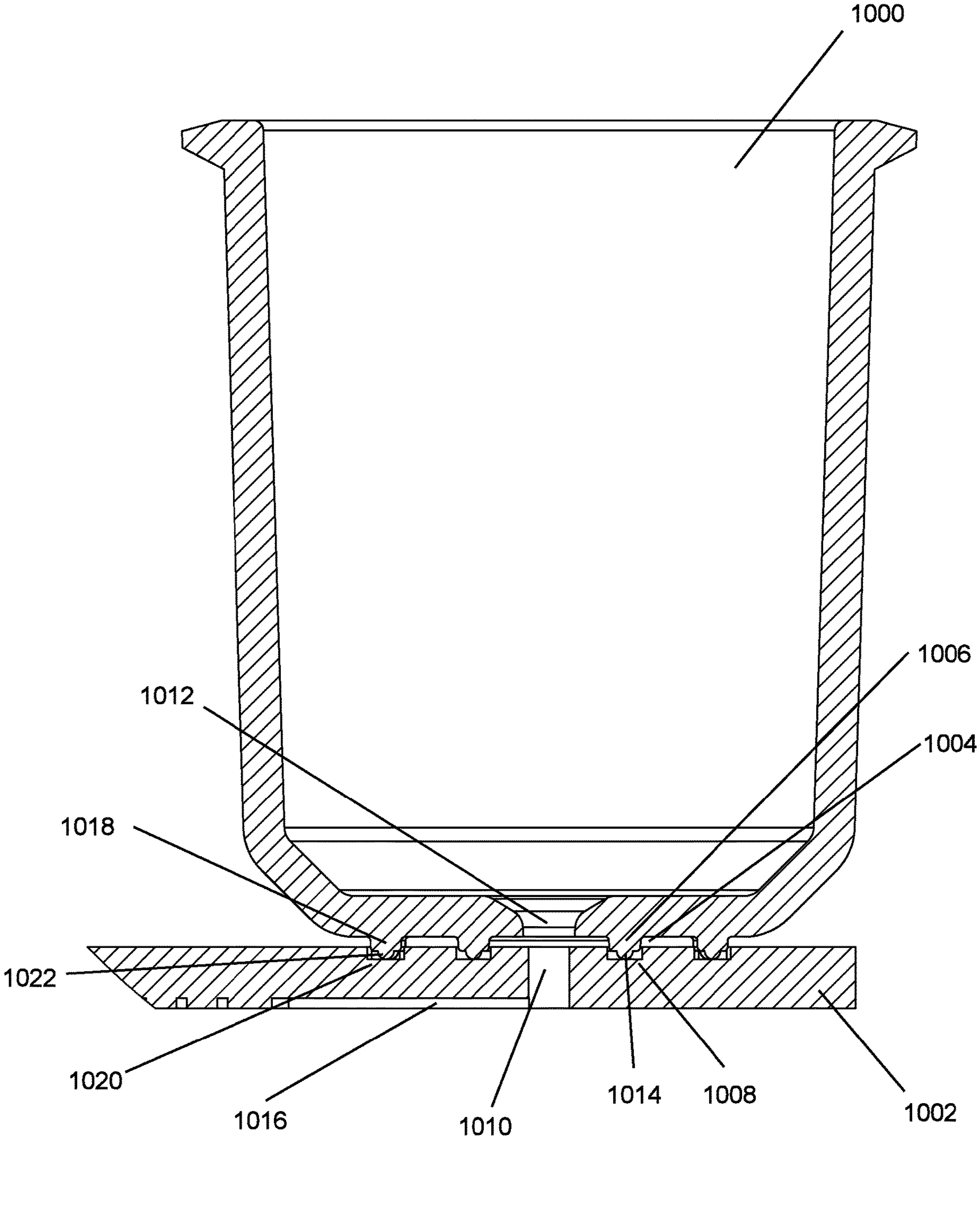
FIG. 10 is a front section view of a reservoir component according to embodiments of the present disclosure.

FIG. 10 shows a front section view of a reservoir component 1000 similar to that shown in FIG. 8 assembled to a solid substrate 1002 similar to that in FIG. 9. The interface 1004 between the reservoir component 1000 and the solid substrate 1002 is similar to that shown in FIG. 4. The tongue 1006 of the reservoir component 1000 fits snugly into the groove 1008 of the solid substrate 1002, causing the via 1010 to be well aligned with the outlet hole 1012 in the reservoir component 1000, also ensuring there is an open channel between the reservoir component 1000 and the microfeatures 1016 in the solid substrate 1002. The boss 1014 rests on the bottom surface of the groove 1008. The dimensions of the tongue 1006, boss 1014, and groove 1008 may be adjusted depending on the application.

Further from the outlet hole 1012, the reinforcement tabs 1018 fit snugly into the reinforcement grooves 1020. A boss 1022 rests on the bottom surface of the reinforcement groove 1020. While a reservoir component 1000 is shown, any component requiring reinforcement tabs 1018 may be used.

Figure 11:
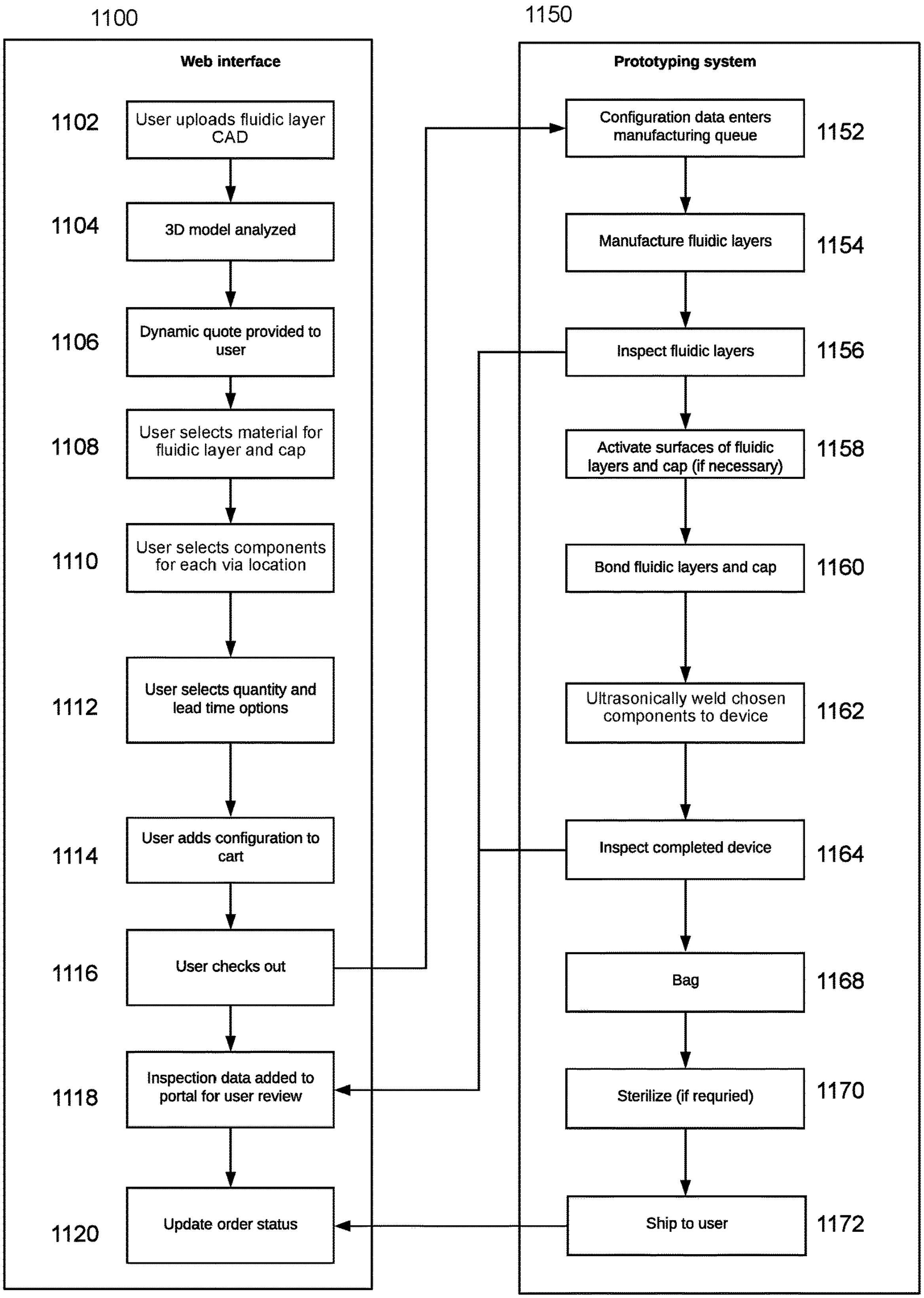
FIG. 11 is a flowchart illustrating a method of prototyping according to embodiments of the present disclosure.

FIG. 11 shows a flowchart representing how a user interacts with our web application 1100 and how the web application 1100 interacts with prototyping system 1150.

The process begins when a user creates a three-dimensional computer-aided-design model (CAD model) of their desired solid substrate, e.g., 202, as shown in FIG. 2. The CAD model must incorporate all of their desired microfeatures 200 and any vias 206 that must pass to the top surface of the solid substrate with microchannels 202. The user generated CAD does not need to incorporate any components 210, or grooves 208.

Figure 16:
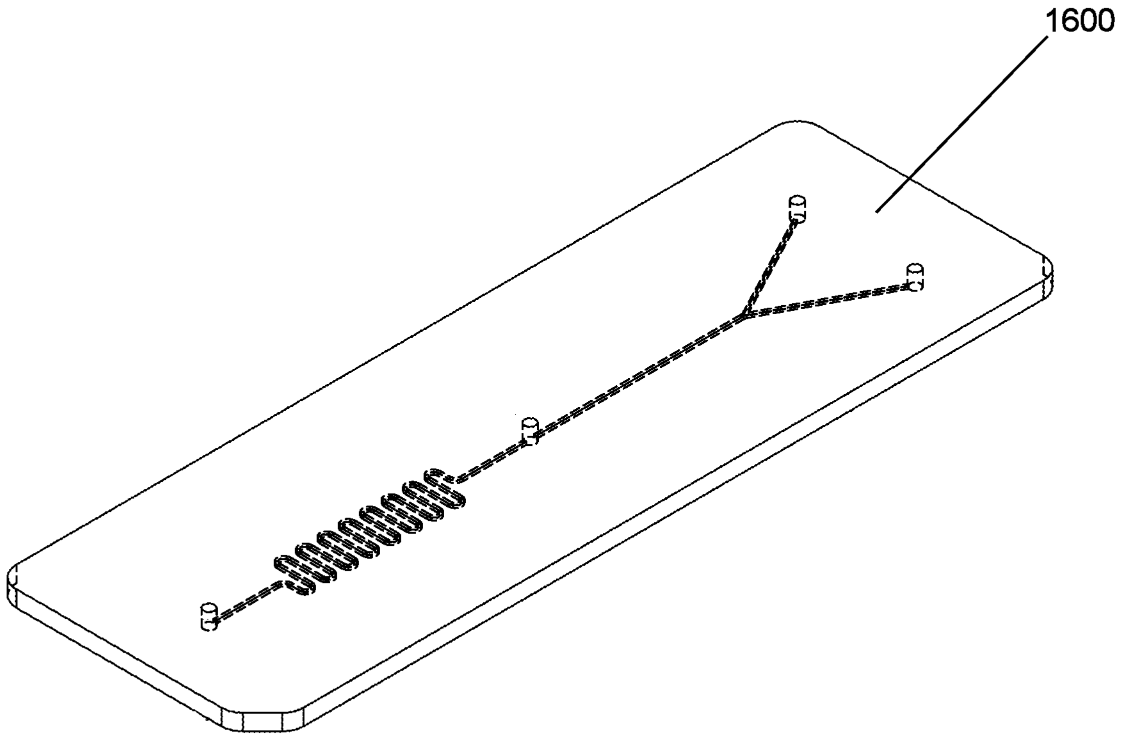
FIG. 16 is a perspective view of an exemplary solid substrate according to embodiments of the present disclosure.

Referring now to FIG. 16, an example solid substrate 1600 created in CAD by a user is shown.

Referring now to FIG. 11, once the user has created their desired CAD model, they can upload it to a web application 1102. The 3D model 1104 can be analyzed either automatically or manually and then provide a dynamic quote to the user 1106. In the analysis, it is determined if the user included vias 206 that are compatible with pre-built components 210. Within the dynamic quote, the user can select material options for their fluidic 202 layer and cap 212 from a list of available materials 1108.

Next, the user can select predefined components 1110 to mate with each via 206 incorporated in their solid substrate with microchannels 202. The components 210 are developed in-house and may include connectors, reservoirs, sample chambers, pumps, sensors, bubble traps, gasket interfaces, electrodes, valves, heaters, or any other component that might be useful in a microfluidic device. The modular component approach is novel to our process, and is not provided by any existing prototype microfluidic device manufacturers. Typically users are forced to design all of their desired functionality into a single custom design. By allowing users to select components that have already been validated, it allows them to avoid the engineering risk and cost associated with designing all of their functionality from scratch.

After selecting quantity and lead time 1112, the user can then add a configuration to their cart 1114 and check out 1116. When the user checks out 1116, their selected configuration data will automatically be sent to our manufacturing queue 1152. The prototyping process begins by manufacturing the user's solid substrate 1154.

Referring now to FIG. 2, the solid substrate 202 can be produced in a thermoplastic material such as polycarbonate, cyclic olefin copolymer, cyclic olefin polymer, polymethylmethacrylate, polystyrene, polyethylene terephthalate, polyethylene terephthalate glycol, high density polyethylene, polypropylene, polyetheretherketone, polyoxymethylene, and others by a variety of methods. In an exemplary embodiment, the solid substrate 202 can be machined from blank thermoplastic sheets and then embossed with microfeatures 200 in a hot embossing process. Some advantages of combining a machining and hot embossing process is that tooling costs are minimal, small tolerances can be achieved, part to part variation is minimized, and optical clarity can be maintained by avoiding deformation of the defect-free manufactured sheet surface, from which the original blanks are machined. Alternatively, the solid substrate 202 may be produced by injection molding, hot embossing, machining, casting, compression molding, thermoforming, or any combination thereof, or other technique known in the art.

Grooves 208 will be created surrounding each user-defined via 206 based on the selected components 210 from the quoting process 1110. The geometry of the groove 208 may be circular, rectangular, or any other shape that may fully surround a via 206. The groove's dimensions, such as depth and width, are dependent on the component 210 geometry. The groove 208 may be manufactured simultaneously with the rest of the solid substrate 202, or may be produced later by a secondary process.

The microfeatures 204 within a microfluidic device 200 must be created accurately to ensure proper functionality of the device. Since microfeatures are often as small as tens of microns, measurement via mechanical means like calipers or micrometers may be difficult. To ensure accuracy, the completed solid substrate 202 is measures with an optical measurement system such as a laser profilometer, structured light optical profilometer, laser confocal microscope, scanning electron microscope, or any other available option known in the art 1156. The inspection data generated during the measurement process may then be uploaded back to the user's portal in our web application 1118.

Satisfactory solid substrates 202 are then bonded with a cap 212. The cap 212 is a sheet that may be the same thermoplastic material as the solid substrate 202, a different thermoplastic material, an adhesive film, or a heat sealable film. The cap 212 and the solid substrate 202 may be the same or different thicknesses and shapes.

Referring now to FIG. 6, in come embodiments, an upper solid substrate 602 may be bonded with one or multiple lower solid substrates 610, in addition to a cap 616. The lower solid substrates 610 may be the same thermoplastic material as the upper solid substrate 602, a different thermoplastic material, an adhesive film, or a heat sealable film.

In some embodiments, the cap 212 is the same thermoplastic as the solid substrate 202. Techniques to bond similar thermoplastics while minimizing microfeature 204 deformation are known in the art. This process may involve compressing the solid substrate 202 and the cap 212 in a press heated to roughly the glass transition temperature of the thermoplastic material. In some instances, it may be necessary to activate the surface of the thermoplastics with a method such as solvent, plasma, UV-ozone, or some other means to create good bond strength while minimizing channel deformation.

Producing a microfluidic device 200 entirely from the same thermoplastic may be advantageous because a single material may be best suited for a given application. In many microfluidic projects, developers are concerned with properties such as optical clarity, chemical resistance, surface energy, cost, and temperature resistance, among others. A device created entirely from one material may satisfy more necessary criteria than a device created from multiple materials. Additionally, when a microfluidic developer transitions to high volume production of an integrated design via a process like injection molding, it is often only possible to produce a device via one material.

After the solid substrate 200 and cap 212 have been bonded, components 210 may be attached to the microfluidic device 200. A challenge in microfluidic device development is to ensure strong, leak-free, and contamination-free connections between different portions of a device. Existing attachment methods include press-fitting, gluing, solvent bonding, or using adhesive tape. However, these methods have many drawbacks. A press-fit connection may be prone to leaks. Glue may occlude microfeatures, leach contaminants into liquids during experiments, and require extensive curing time. Solvent bonding can be inconsistent and difficult to achieve. Adhesive joints may be structurally weak, difficult to align, and leach contaminants. Due to these drawbacks, modular components 210 of various sizes, shapes, and functionality are attached to a microfluidic device via ultrasonic welding.

Referring now to FIG. 3, a bottom perspective view of a threaded component 300 is shown. The threaded component 300 is similar to the threaded component 108 shown in FIG. 1, but alternatively may be any component useful in microfluidic development. The outlet hole 302 creates an open connection between the interior of the threaded component 300 and its bottom surface. A half-round boss 302 protrudes from the top of the tongue 304.

Referring now to FIG. 4, the interface 400 is the joint between an embodiment of a threaded component 404 and a solid substrate 402. The tongue 406 of the threaded fitting 404 fits snugly into the groove 406 of the solid substrate 402, causing the via 410 to be well aligned with the outlet hole 412 in the threaded fitting 404, also ensuring there is an open channel between the threaded fitting 404 and the microfeatures 416 in the solid substrate 402. The boss 414 rests on the bottom surface of the groove 408. In this embodiment, the boss 414 is a half-round feature protruding from the surface of the tongue 406. The solid substrate with microchannels 402 and the component 404 may be composed of the same thermoplastic material, or different thermoplastic materials.

Referring now to FIG. 7, an alternative embodiment is shown of the interface 702 between a component 704 and a solid substrate 702. The interface 702 is similar to the interface 400 shown in FIG. 4. In this embodiment, the upper solid substrate with microchannels via 710 is well aligned with the outlet hole 711 located in the component 704. The lower solid substrate with microchannels via 712 is well aligned with the upper solid substrate with microchannels via 710, ensuring there is an open connection between the microfeatures 716 in the upper solid substrate with microchannels 702, the microfeatures 714 in the lower solid substrate with microchannels 708, and the outlet hole 711 in the component 704. In alternative embodiments, the via 712 in the lower solid substrate with microchannels may connect to additional solid substrates with microchannels, and may or may not connect to a component 704 on the top surface of the upper solid substrate with microchannels 706. Depending on the application, vias 712, 710, can be used to connect any number of solid substrates with microchannels 706,708 and components 704.

In an exemplary embodiment shown in FIG. 17, an interface 1700 substantially similar to that shown in FIG. 4 is inverted such that the tongue 1706 resides in the component 1704 and the groove 1708 resides in the solid substrate 1702.

Figure 12:
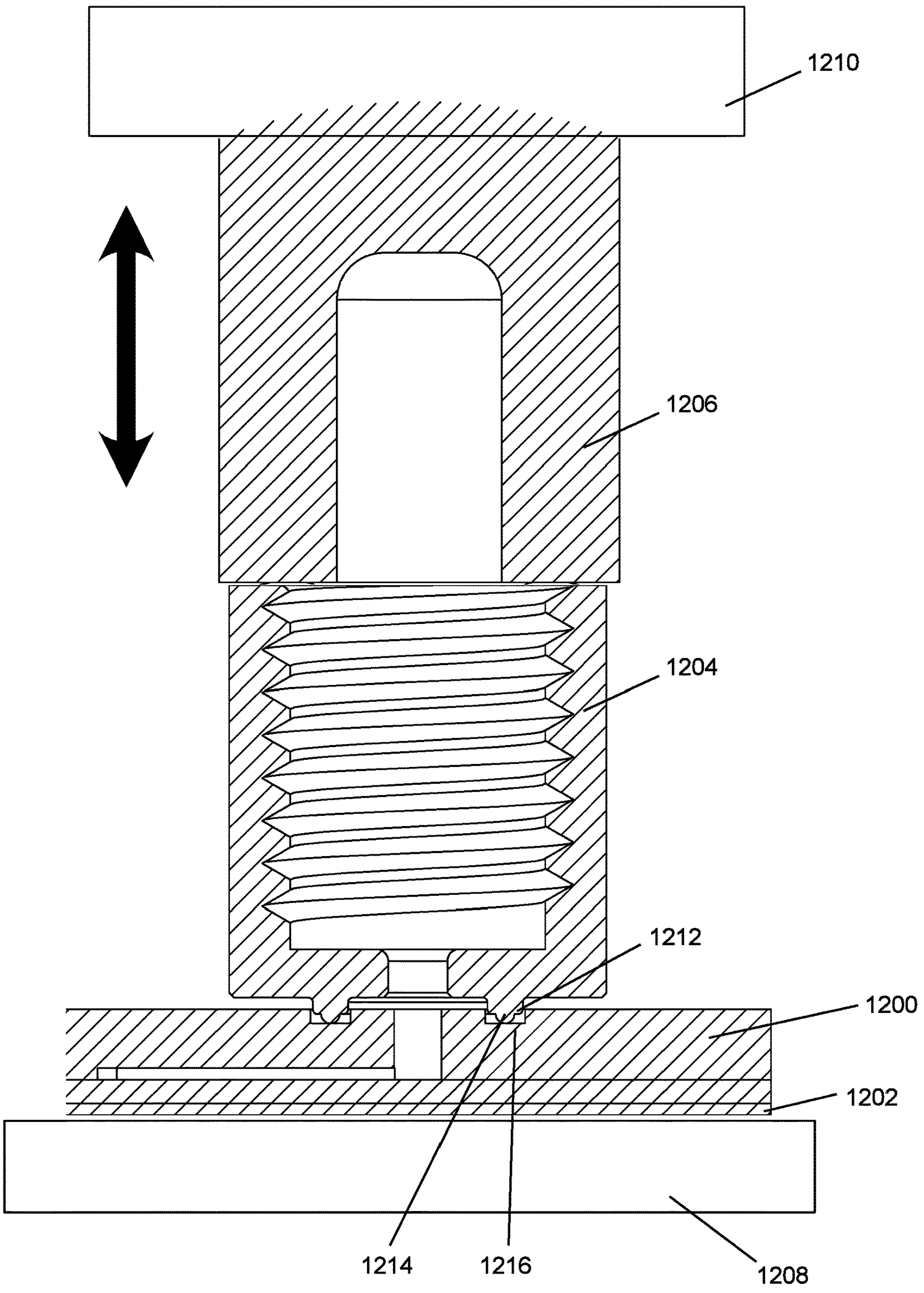
FIG. 12 is a section view of a solid substrate, cap and threaded component loaded into an ultrasonic welder according to embodiments of the present disclosure.

Referring now to FIG. 12, a bonded solid substrate 1200 and cap 1202, and threaded component 1204 are loaded into an ultrasonic welder. The ultrasonic welder consists of a horn 1206 connected to an ultrasonic energy generator 1210 that may move in a controlled manner in the Z direction, and may be driven by a mechanical, pneumatic, or hydraulic system. The anvil 1208 is a fixed, rigid, massive surface. When actuated, the horn 1206 compresses the threaded component 1204, solid substrate 1200, and cap 1202 against the anvil to a predetermined force, which may be 50 newtons, 100 newtons, or any other suitable force. The ultrasonic generator 1210 is activated when the ultrasonic welder reaches the predetermined force and vibrates the horn 1206 at a high frequency, in some embodiments 20 kHz, 30 kHz, or 40 kHz, among others. The ultrasonic energy passes through the horn 1206, into the threaded component 1204, into the tongue 1212, the boss 1214, the groove 1216, the solid substrate 1200, the cap 1202, and the anvil 1208. The ultrasonic energy flowing through the threaded component 1204 and the solid substrate 1200 is confined to the small surface when transferred from the boss 1212 to the groove 1210, and thus raises the temperature of the thermoplastic material in this region. The boss 1212 and the groove 1210 eventually reach the glass transition temperature of the thermoplastic and begin to melt.

Figure 13:
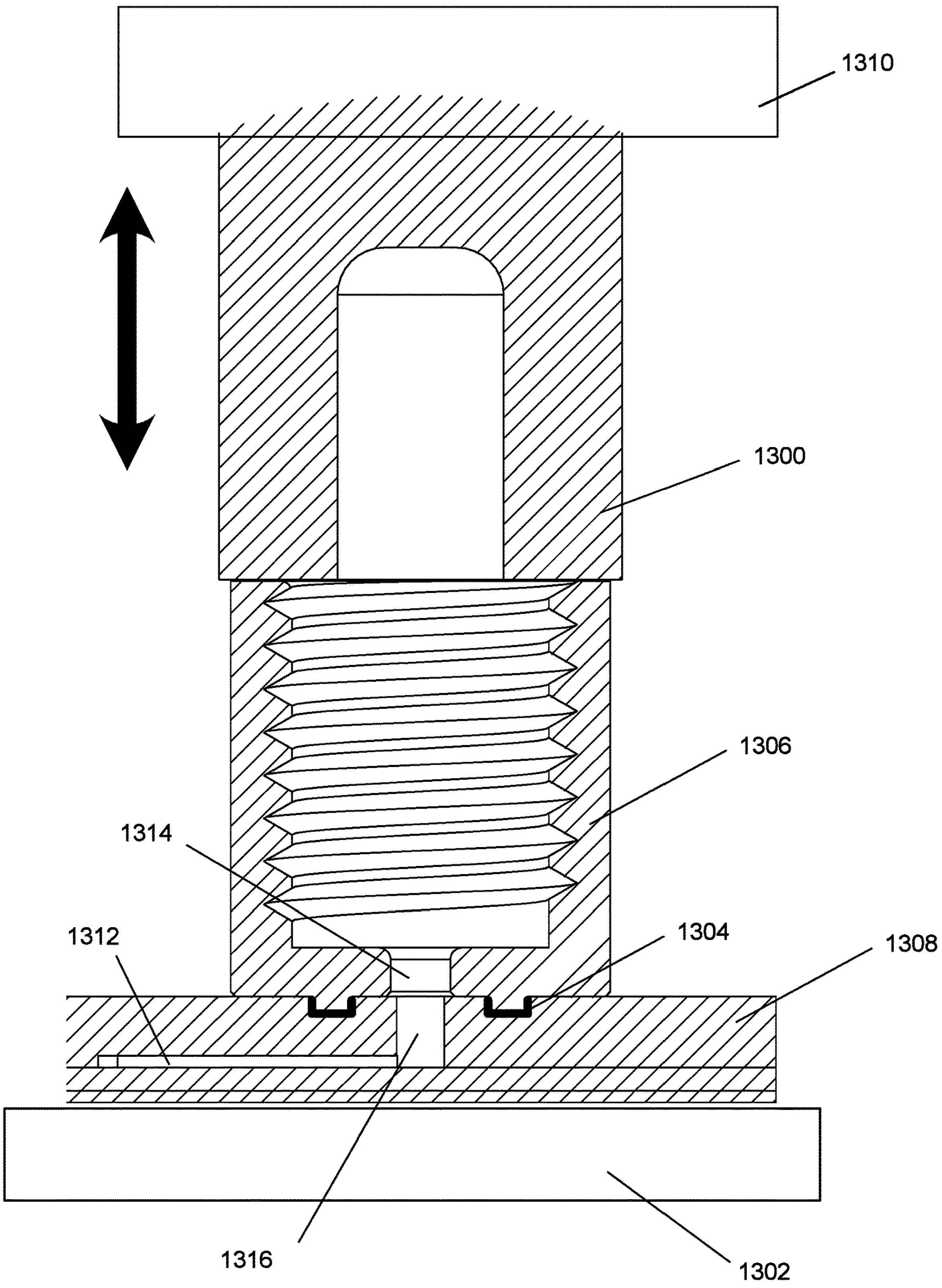
FIG. 13 is a section view of a solid substrate, cap and threaded component loaded into an ultrasonic welder according to embodiments of the present disclosure.

Referring now to FIG. 13, the ultrasonic horn 1300 continues to move towards the anvil 1302 at a predefined rate and the melted thermoplastic 1304 of the threaded component 1306 and solid substrate 1308 intermingles. The horn 1300 is stopped and the ultrasonic generator 1310 is shut down after a predetermined amount of time has passed, or energy has been dissipated, or distance has been traveled. The melted plastic 1304 cools and solidifies, forming a robust, liquid-tight, mechanically strong seal between the threaded component 1306 and the solid substrate 1308. Importantly, the ultrasonic welding process does not deform the microfeatures 1312 within the solid substrate 1308. Additionally, neither the output hole 1314 nor the via 1316 are occluded with particulate, melted plastic, or any other contamination. The ultrasonic welding process does not create any additional dead volume between the threaded component 1306, the solid substrate 1308, and the via 1316. The time required to complete the ultrasonic welding process may only take a few seconds. The ultrasonic connection is advantageous to a glued joint because there is little risk of the channel occlusion associated with glue joints, alignment problems due to adhesive tapes, microfeature deformation from solvent bonding, or leak problems that arise from press fits.

Figure 14:
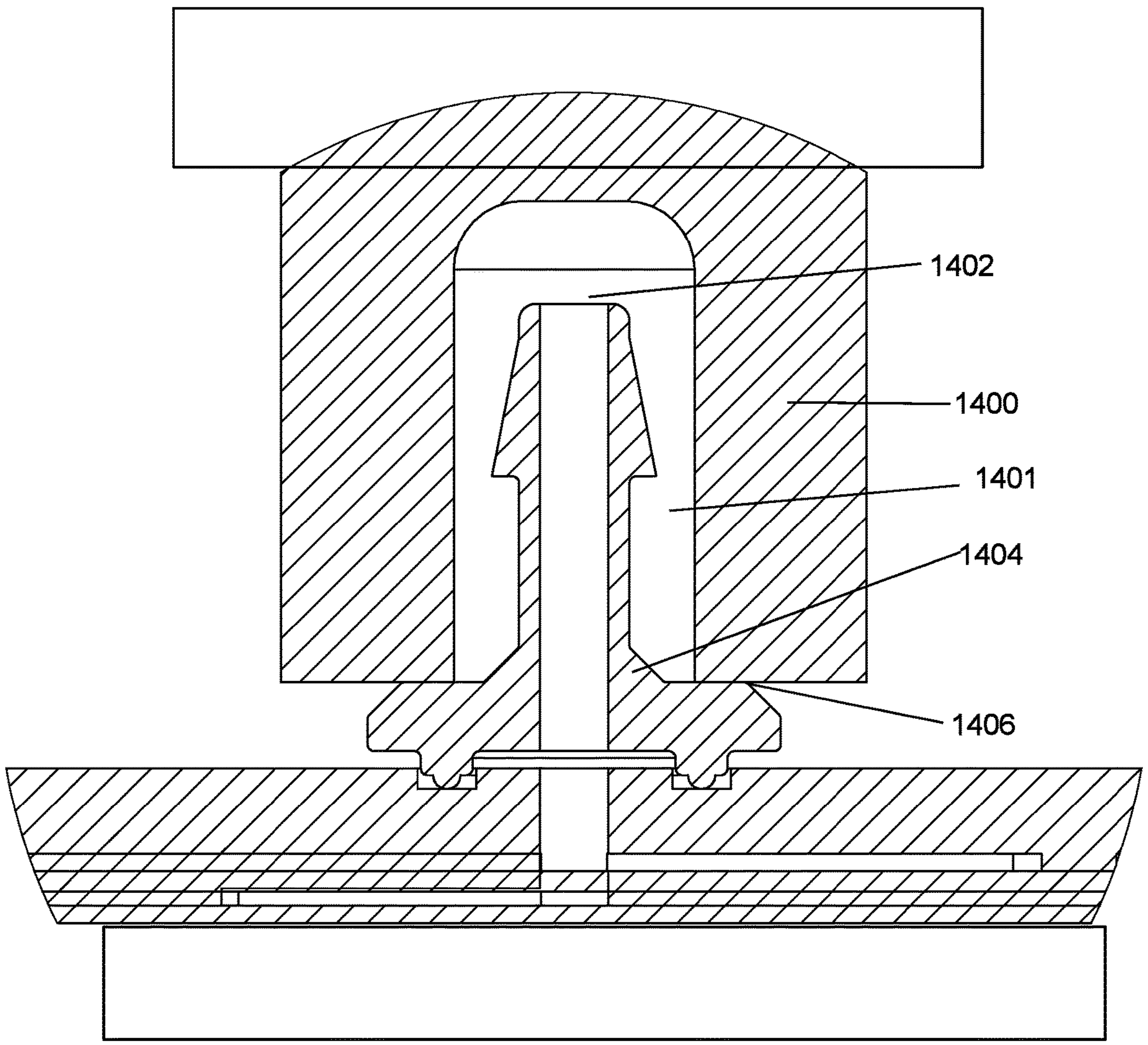
FIG. 14 is a section view of a solid substrate, cap and threaded component loaded into an ultrasonic welder according to embodiments of the present disclosure.

Referring now to FIG. 14, in an exemplary embodiment, the horn 1400 incorporates a recess 1401 and avoids contact with the fragile top surface 1402 of a component such as a barb component 1404. Instead, the horn 1400 contacts the barb component at the base surface 1406, which is less susceptible to damage during the ultrasonic welding process.

Figure 15:
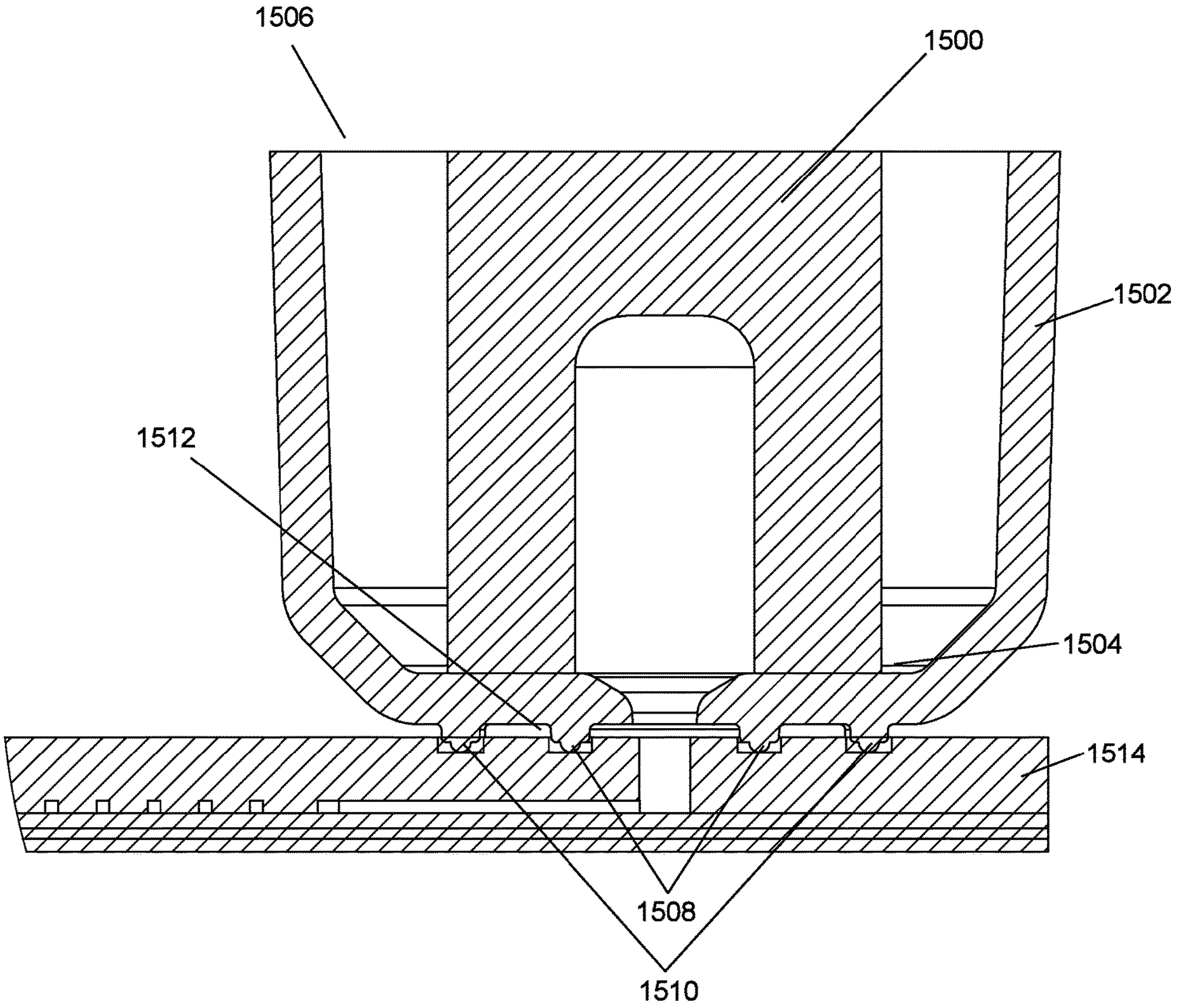
FIG. 15 is a section view of a solid substrate, cap and threaded component loaded into an ultrasonic welder according to embodiments of the present disclosure.

Referring now to FIG. 15, in an exemplary embodiment, the horn 1500 contacts a component such as a reservoir component 1502, similar to that shown in FIG. 8, on its interior base surface 1504 rather than its top surface 1506. The transfer of ultrasonic energy to the bosses 1508 is improved because the ultrasonic energy only has to travel through a small volume of thermoplastic before reaching the bosses 1508. Additionally, reinforcement tabs 1510 surround the interface 1512, similar to those described in FIG. 10. These reinforcement tabs 1510 also melt and comingle with the solid substrate with microchannels 1514 during the ultrasonic welding process, increasing the strength of the bond between the reservoir component 1502 and the solid substrate 1514.

In various embodiments, ultrasonically weldable components may include connectors, reservoirs, sample chambers, pumps, sensors, bubble traps, gasket interfaces, electrodes, valves, heaters, or any other component that might be useful in a microfluidic device.

Referring now to FIG. 11, the ultrasonically welded microfluidic device 1162 is inspected for accuracy 1164, and the results are added to the web application for user review 1118. The completed device is then placed into an appropriate bag 1168, sterilized 1170 via a technique like steam sterilization, ethylene oxide gas sterilization, gamma sterilization, or other process if necessary, and then shipped to user 1172. After shipping 1172, the order status 1120 is updated in the web application 1100.

As set out above, methods are provided to create functional prototype microfluidic devices in thermoplastic materials quickly. These prototype devices have desirable optical properties, material properties, chemical compatibility, feature accuracy, and components that are typically reserved for integrated designs produced at high volumes. The speed of these processes allows creation of functional prototypes in a matter of days that include pre-built components to reduce engineering risk for users, significantly decreasing the time and cost required to complete a design iteration of a microfluidic device. Prototypes devices are produced using techniques that are all transferable to high volume production when the prototype design is validated. The results combine to reduce the time, cost, and difficulty required to commercialize a microfluidic technology.

Figure 18:
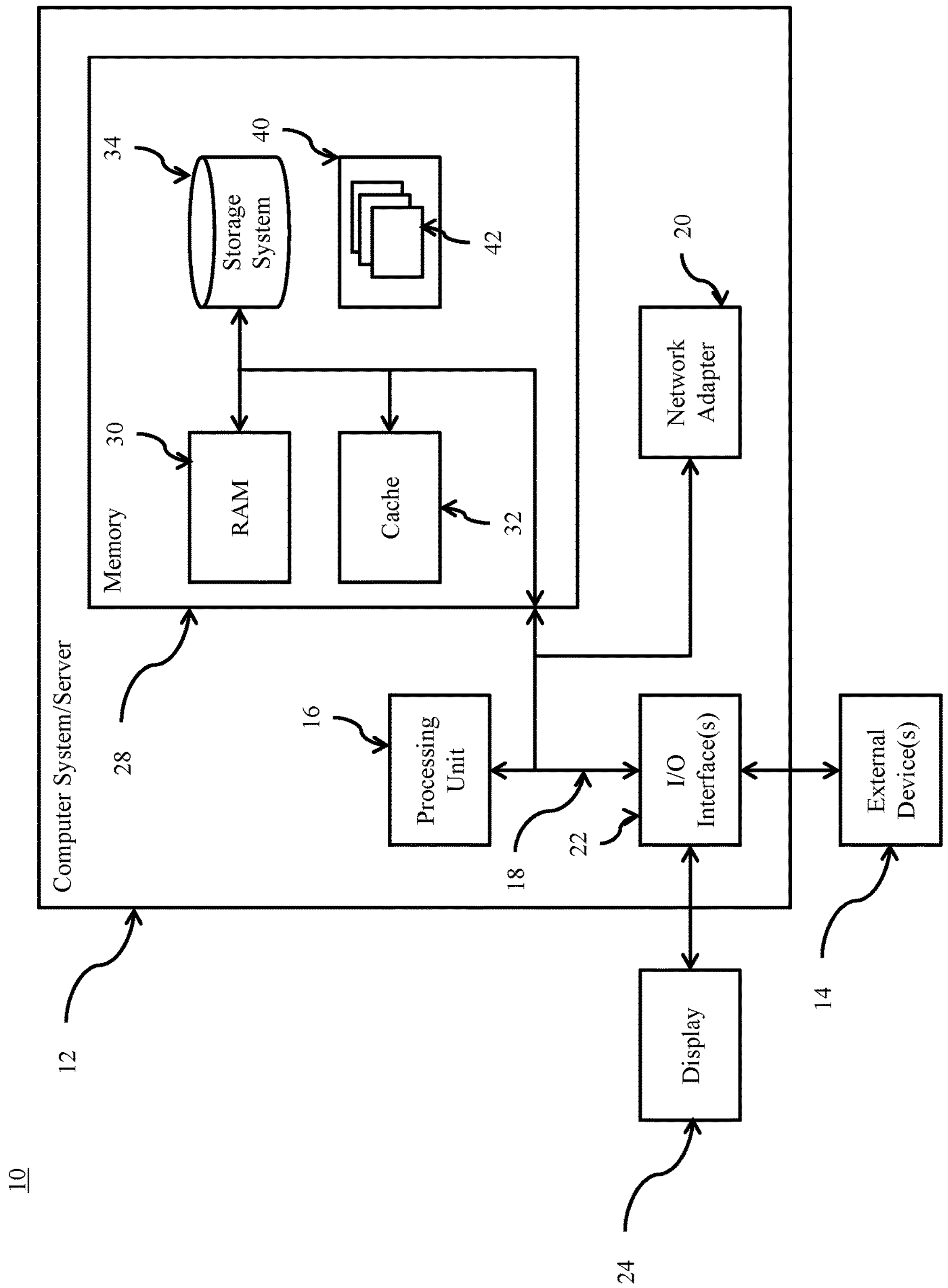
FIG. 18 depicts a computing node according to an embodiment of the present disclosure.

Referring now to FIG. 18, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 18, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a “hard drive”). Although not shown, a magnetic disk drive for reading from and writing to a removable, non-volatile magnetic disk (e.g., a “floppy disk”), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A microfluidic device, comprising:

a solid substrate having a first side and a second side, the solid substrate having at least one via extending through the solid substrate from the first side to the second side, the first side having at least one channel formed therein, the at least one channel in fluid communication with the at least one via, the second side having a continuous groove and a rotational positioning groove therein, the continuous groove configured to circumscribe the at least one via and not being in fluid communication with the at least one via, the rotational positioning groove configured to partially circumscribe the at least one via, wherein the rotational positioning groove abuts the continuous groove;

a module disposed on the second side, the module having a continuous tongue extending into the continuous groove, the continuous tongue having a continuous boss thereof, the continuous tongue configured to be affixed within the continuous groove by a weld, circumscribing the at least one via, wherein the continuous boss is configured to melt, thereby creating the weld, the module further having a rotational positioning tongue extending into the rotational positioning groove, and wherein the rotational positioning tongue is configured to be affixed within the rotational positioning groove by the weld.

2. The microfluidic device of claim 1, further comprising:

a cap disposed on the first side of the solid substrate, covering the at least one channel.

3. The microfluidic device of claim 1, wherein the continuous groove is circular.

4. The microfluidic device of claim 1, wherein the continuous groove is polygonal.

5. The microfluidic device of claim 1, wherein the module comprises a module via in fluid communication with at least one of the at least one via.

6. The microfluidic device of claim 5, wherein the module comprises a reservoir in fluid communication with the module via.

7. The microfluidic device of claim 5, wherein the module comprises a valve in fluid communication with the module via.

8. The microfluidic device of claim 5, wherein the module comprises a luer lock in fluid communication with the module via.

9. The microfluidic device of claim 5, wherein the module comprises a sample chamber in fluid communication with the module via.

10. The microfluidic device of claim 5, wherein the module comprises a pump in fluid communication with the module via.

11. The microfluidic device of claim 5, wherein the module comprises a sensor in fluid communication with the module via.

12. The microfluidic device of claim 5, wherein the module comprises a bubble trap in fluid communication with the module via.

13. The microfluidic device of claim 5, wherein the module comprises a gasket interface in fluid communication with the module via.

14. The microfluidic device of claim 5, wherein the module comprises a threaded connector.

15. The microfluidic device of claim 1, wherein the module comprises at least one electrode configured to apply an electromagnetic field to the at least one via.

16. The microfluidic device of claim 1, wherein the module comprises a heater configured to apply heat to the at least one via.

17. The microfluidic device of claim 1, wherein the module comprises a light configured to illuminate the at least one via.

18. The microfluidic device of claim 1, wherein the solid substrate comprises a thermoplastic.

* * * * *